United States Patent [19]
Janu et al.

[11] 3,933,065
[45] Jan. 20, 1976

[54] FLUIDIC MACHINE CYCLE CONTROL

[75] Inventors: George J. Janu, Brookfield; Donn R. Fischer, Milwaukee, both of Wis.

[73] Assignee: Johnson Service Company, Milwaukee, Wis.

[22] Filed: Apr. 18, 1974

[21] Appl. No.: 462,296

[52] U.S. Cl. .................. 83/62; 83/68; 83/639; 192/131 R; 317/135
[51] Int. Cl.[2] ................ B26D 5/00; B26D 7/24
[58] Field of Search .............. 83/58, 62, 68, 639; 192/131 R, 131 H; 317/135

[56] References Cited
UNITED STATES PATENTS

| | | | |
|---|---|---|---|
| 2,959,263 | 11/1960 | Simson | 192/131 R X |
| 3,315,243 | 4/1967 | Weiberg | 317/135 X |
| 3,443,575 | 5/1969 | Hughes | 192/131 R |
| 3,605,554 | 9/1971 | Philbrick | 192/131 R X |
| 3,648,552 | 3/1972 | Bradley | 83/68 |
| 3,813,021 | 5/1974 | Kramer | 192/131 R X |

*Primary Examiner*—Willie G. Abercrombie
*Attorney, Agent, or Firm*—Andrus, Sceales, Starke & Sawall

[57] ABSTRACT

A press control includes a pair of pushbuttons each operating a pneumatic pump means to form a pair of signal pulses and an integrated valve to form a pair of binary logic pressure signals. A press position sensor provides a binary pressure signal related to the press position. The pushbutton and sensor signals are connected to fluidic logic gate means to compare and detect the actuation of the pushbuttons as well as the status of such pushbuttons and the press cycle. The logic output is connected by a plurality of logic gates to actuate a flip-flop output unit to generate an extend output or a retract output. The flip-flop output unit has an input connected to a latch input control to provide automatic reset to the retract output if release of the button signal sources occurs during a hazardous portion of the extend cycle. Once the non-hazardous portion of the extend cycle is reached, the latch is complete for the terminal portion of the extend cycle. A fluidic fuse in the form of a diaphragm comparator monitors the extend output and the operation of the pushbuttons and automatically responds to terminate press operation if the logic signal outputs of the pushbuttons are not formed prior to creation of the extend signal. After creating of the extend cycle, a special bleed system permits release of the pushbuttons after the hazardous portion of the extend cycle is complete.

32 Claims, 4 Drawing Figures

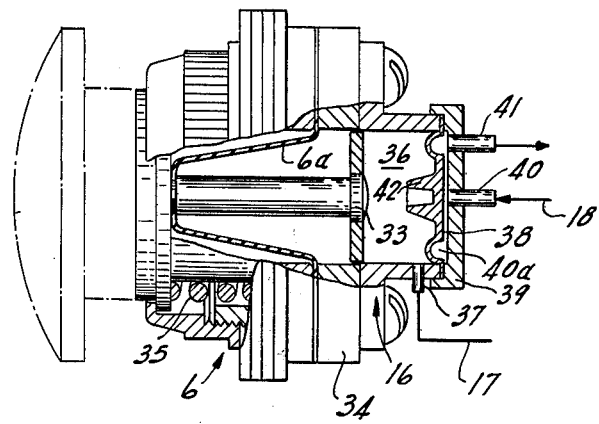
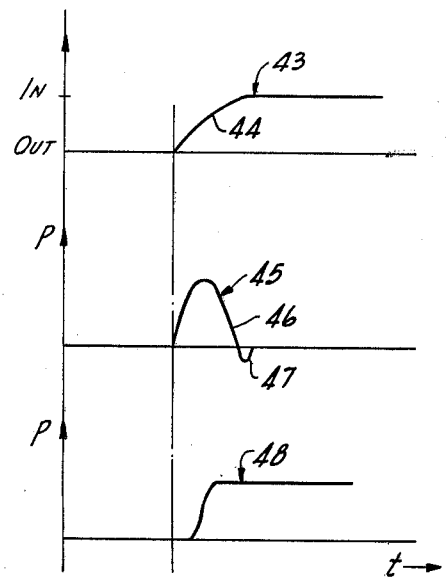
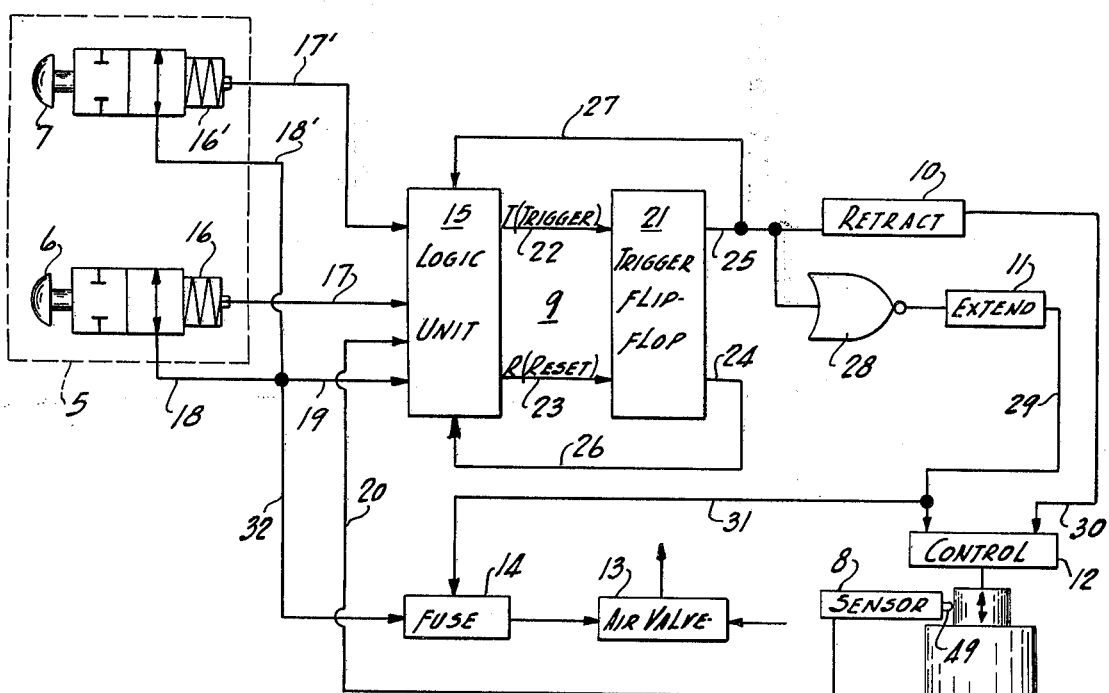
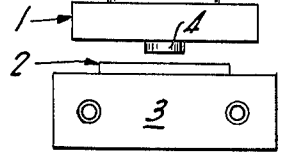

FLUIDIC MACHINE CYCLE CONTROL

BACKGROUND OF THE INVENTION

This invention relates to a fluidic control system for manually operated machines and the like.

In manufacturing processes, a machine is often manually loaded and unloaded. Additionally, the operating parts may be manually cleaned and otherwise maintained. Manually operated devices having elements moving in the work area are potentially dangerous to the operating personnel. In the event a control or drive system malfunctions or a human error, the moving work element may strike the arms or body of the personnel in the work area. In particular, cutting or shearing machines, punch presses and the like have a ram die which reciprocates in spaced cycles in a work area. The operating personnel often introduce their hands and arms between the working die and the press bed during the feeding and removal of material. Press control systems, and the like, have, therefore, generally required that the system employ a pair of manually operated electrical controls such as pushbutton switches which are spaced and connected such that the operating personnel must maintain both of his hands in engagement with the respective switches during the time the press work element is moving to engage the work to thereby protect the operator during the hazardous portion of the operating cycle. Such controls generally include a non-tie-down feature which will prevent the operator from otherwise latching one or both switches on in order to increase the work rate or the like. Also, an anti-repeat feature is generally included, that will guarantee that all the switches must be released by the operator and then actuated again in order to initiate a next work cycle of the press. Further, if maximum safety is to be obtained, the system must be failsafe and provide for automatic shutdown in the event of any malfunctioning of the control or operating components.

Although various electrical anti-repeat press control systems have been developed, they require relatively complicated electrical circuit controls, and are characterized by the normal electrical maintenance and failure characteristics.

SUMMARY OF THE PRESENT INVENTION

The present invention is particularly directed to a fluid control system for a cyclically operating machine which is manually controlled and is constructed to establish and maintain a safe operating cycle with continuous monitoring means to prevent defeat of the control by the operating personnel and to terminate operation in the event of system malfunction.

Generally, in accordance with the teaching of the present invention, a pair of fluid signal source means having manual inputs such as depressible buttons are provided and located for spaced operation by the hands of the operating personnel. Each signal source means establishes a pair of logic signals which, in a preferred structure, is a pulse signal and a logic binary signal. A fluid sensor monitors the movement of the controlled machine parts and produces a machine position fluid logic signal. A fluid logic system combines the fluid signals of the fluid signal sources and the sensor to detect the condition of the switches in relationship to the position of the moving parts and to actuate a fluidic control which is selectively connected to enable the operating circuit for the apparatus. The control particularly prevents machine operation if a proper and safe sequence is not followed, or maintained. The fluidic logic system and the fluidic control buttons are interrelated to positively prevent defeating of the system by tie-down of one or both of the buttons as well as preventing automatic repeat operations.

If any of the fluidic inputs or signals are in a wrong state, the system automatically terminates operation and only latches on to permit continued machine operation in response to the normal operation and sensing of the termination of the dangerous operating condition of the device. Further, the control output is continuously monitored in accordance with logic system output and if the output is not in a proper state, the system shuts down by, for example, terminating the fluid supply. Although any fluid may be employed, a pneumatic system is preferred and hereinafter referred to in discussion of the invention.

More particularly in a preferred novel construction of the present invention, each of the signal sources includes an input pushbutton or other manual control element operating a signal generator having a pumping section adapted to be manually moved to generate a signal pulse coupled into the logic circuit and to further provide binary logic signal, such as a pressure related to the actuated position of the buttons to provide a second interlocking signal. The output of pushbuttons and of the sensor are connected into a fluidic logic unit having fluidic logic gate means or the like to compare and detect that actuation of the pushbuttons as well as the status of such pushbuttons and the machine cycle to produce a trigger signal and a reset signal. The trigger and reset signals are connected to actuate a bi-stable fluidic switching circuit such as a triggered flip-flop unit to produce an extend logic signal and a retract logic signal. A pneumatic interface includes suitable logic gates connected to control valves which provide the operating extension and retraction signals such as fluid pressure to the working member drive means. The bi-stable circuit is only conditioned to produce a continuous extend signal in response to simultaneous activation of the pushbuttons with the machine sensor indicating a starting position and with logic output of the flip-flop unit in the retract state. Further, release of the button signal sources during the hazardous portion generates the reset signal and automatically resets the bi-stable circuit. This ensures that if the sensor or the output is in the wrong state, the trigger flip-flop will reset and terminate operation of the system. Once the non-hazardous portion of the cycle is reached, the bi-stable circuit will latch to complete the terminal portion of the cycle, and the operator may do other necessary duties. The control will recycle only by releasing the pushbuttons and reactivating such pushbuttons simultaneously, such that the system cannot be defeated by tying down of the control buttons.

Further, a fluidic fuse or sequence monitor responds to the logic or drive output. If the output should rise without an indication of the pushbuttons being held in the actuated position, the fuse automatically responds to terminate the operation of the main supply to the system. In particular, the logic signal outputs of the pushbuttons are combined and impressed upon the control side of a diaphragm fluid switch, the opposite side of which is connected in series to a system pressure and to a supply control valve. With the control buttons depressed prior to creation of the extend signal, the valve is not operated and system supply is maintained. After latching of the cycle control, the switches can be released, and a special bleed system will continue to operate as long as the proper sequence is maintained. If an attempt should be made to turn on the system without proper signals from both of the button signal sources held in the actuated position, the extend signal actuates the diaphragm switch which actuates the control valve to instantly terminate operation of the machine.

The present invention thus provides a highly improved fluidic system avoiding the complexity and difficulties associated with the other systems employing electronic circuitry, while maintaining the anti-repeat control with latched circuit operation following the hazardous portion of a machine cycle and a complete interlock during the hazardous portion. The system also provides a complete failsafe design which can be readily driven from a conventional air supply.

BRIEF DESCRIPTION OF DRAWINGS

The drawings furnished herewith illustrate a preferred construction of the present invention in which the above advantages and features are clearly illustrated as well as others which will be readily understood from the following description.

In the drawings:

FIG. 1 is a diagrammatic illustration of a fluid press control constructed in accordance with the present invention;

FIG. 2 is a side elevational view of a pushbutton operated signal source diagrammatically shown in FIG. 1, with part broken away and sectioned to more clearly illustrate details of construction;

FIG. 3 is a series of characteristics illustrating the output of the pushbutton unit shown in FIG. 2.

DESCRIPTION OF ILLUSTRATED EMBODIMENT OF THE INVENTION

Figure 4:
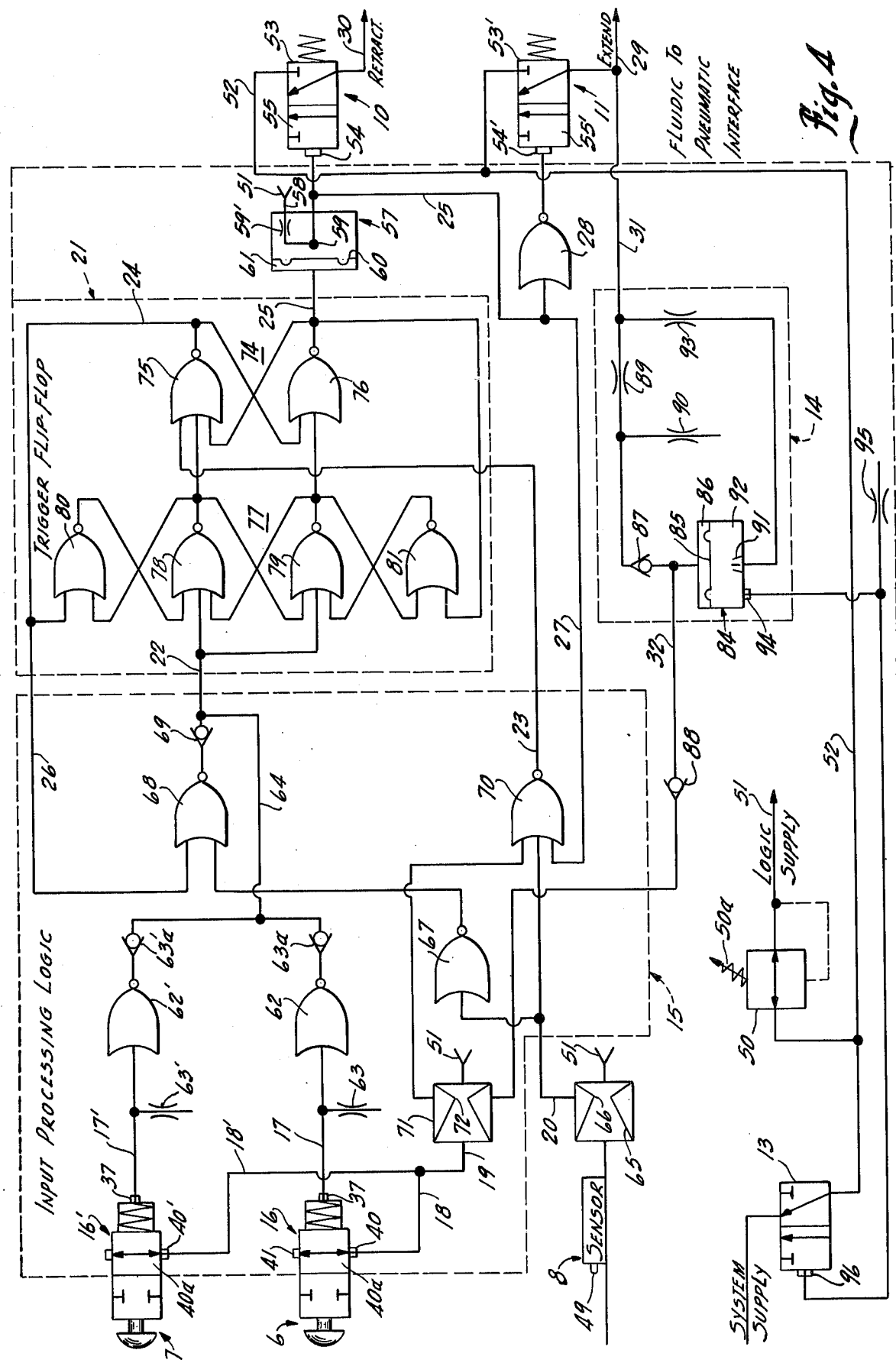
FIG. 4 is a schematic illustration of the systems shown in FIG. 1 and more clearly illustrating a preferred construction of the present invention.

Referring to the drawings and particularly to FIG. 1, a manually controlled machine such as a punch press 1 is diagrammatically shown for purposes of illustrating the present invention. Generally, the press is adapted to have a work plate 2 manually introduced and removed from the work area, and particularly on a die bed 3 beneath a powered punch 4. A manual control panel 5 is provided having a pair of manually operated control elements shown as pushbutton elements 6 and 7 for controlling the operation of the punch 4. The pair of pushbutton elements 6 and 7 require the operator to employ both hands simultaneously during the hazardous portion of the working cycle, to thereby ensure that his hands are not within the punch or work area of the machine 1. The pushbuttons 6 and 7 are interconnected with a die punch position sensor 8 to control the operation and ensure safe operation of the machine 1 during the hazardous portion and to permit latched automatic operation during the non-hazardous portion of a press cycle.

The present invention is particularly directed to a fluidic interlock and control system responsive to the outputs of the pushbutton units 6 and 7 and the sensor 8 to ensure a reliable and safe operation of the system. In accordance with the present invention, the fluidic control system includes a fluidic signal processing unit 9 having the fluidic pushbuttons 6 and 7 and the sensor 8 as the inputs thereto and selectively accuating a retract control 10 and an extend control 11 for correspondingly operating of a main drive control 12 for retracting or withdrawing the punch 4 with respect to the die bed 3 and alternatively extending thereof during a working cycle. The controls 10 and 11 are pneumatic devices connected by a main control valve 13 to a suitable air supply such as conventionally available in commercial buildings. A fluidic fuse 14 controls valve 13 to terminate operation if an improper sequence is created particularly during the hazardous, working portion of the movement of punch 4. The supply valve 13 also provides a logic supply to the signal processing unit 9 such that the total system terminates operation in the event of a selected abnormal condition.

More particularly, the signal processing unit 9 includes an input logic unit 15 combining the inputs of pushbuttons 6 and 7 and sensor 8 as well as certain feedbacks. Referring particularly to FIG. 1, the pushbutton 6 includes a fluidic signal source 16 which establishes a pair of outputs including a pulse signal at pushbutton actuated pulse line 17 and a bi-level logic signal at a on-off signal line 18. The pulse signal lines 17 and 17' form first and second inputs to the logic unit 15 while the on-off signal lines 18 and 18' of units 6 and 7 are connected to a common input line constitute a third input to the logic unit. The sensor 8 establishes a fluidic signal which is coupled through an input line 20 as a fourth input to the logic unit 15. These four inputs provide a continuous indication of the position of the pushbuttons 6 and 7 and the position of the punch 4. The four signals are processed to selectively control a bi-stable triggered switch 21, which is diagrammatically shown as a flip-flop unit. The output of the logic unit 15 includes a set signal line 22 and an alternate reset line 23 connected to the two inputs of switch 21. The triggered switch 21 establishes a pair of outputs including a positive output 24 and a "not" output 25. The "not" output 25 is connected to selectively control the retract drive unit 10 and the extend drive unit 11. The outputs 24 and 25 are also connected by feedback lines 26 and 27 to the logic unit 15 to provide continuous monitoring of the output of the triggered switch 21 in relationship to the previously described inputs and to permit latching of the system after the hazardous portion of the cycle has been established.

The "not" output of the triggered bistable switch 21 is connected directly to activate the retract control 10 and is connected through a fluidic logic invertor 28 to activate the extend control 11. Controls 10 and 11 produce the opposite drive signals at the output coupling lines 29 and 30 to the main drive control 12.

The output signal condition and the pushbutton position are further interconnected, as signals to the fuse 14 to provide a related interlock. Thus, the feedback line 31 is connected between the extend output line 29 and the fuse 14. A coupling line 32 connects the common line 19 from both pushbutton units 6 an 7 to the fuse 14. The fuse 14 functions to insure that the pushbutton units 6 and 7 are activated before creation of an extend signal at line 29. If this does not occur, the pneumatic fuse 14 will automatically actuate the air supply valve 13 to terminate the supply of fluid to the controls 10 and 11 and the like, thereby preventing the continued operation.

Generally, the operator must simultaneously actuate the control pushbuttons 6 and 7 to establish the two pulse signals in order to start punch 4 and further must maintain the buttons 6 and 7 fully depressed during the complete punch working cycle or hazardous portion of the working cycle to maintain the proper signal at line 19. The logic unit 15 through the sensing of the actuation of the pushbuttons 6 and 7 and the continued state thereof in combination with the output of sensor 8 of the feedback signals thus controls the hazardous portion of each cycle. The system includes an anti-repeat or tiedown feature wherein the pushbuttons 6 and 7 cannot be tied down because both the pulse signals and the On/Off condition signal must be created and the pushbuttons must be held in to establish and maintain the operation of the machine during the hazardous portion but the buttons must be released and reactivated to recycle for a subsequent cycle. The loss of any one of the external control connections as a result of fuse 14 and the state of the controls 10 and 11 terminates system operation. The fuse 14 also terminates operation upon the loss of a proper pneumatic signal sequence.

Although the pushbutton units 6 and 7 can be of any suitable construction, a highly satisfactory and preferred construction is shown in FIG. 2 with the output characteristic shown in FIG. 3. Each of the pushbutton units 6 and 7 is similarly constructed and the pushbutton unit 6 is described in detail with the corresponding elements of the unit 7 identified by corresponding prime numbers. Thus, referring to FIG. 2, the illustrated pushbutton unit 6 and particularly the signal source 16 includes a plunger 33 protruding through a diaphragm 6a and sealed thereto. The plunger 33 is slidably mounted within a housing 34 and mechanically connected to the pushbutton 6 to move the diaphragm 6a. The plunger-diaphragm assembly is spring loaded by a suitable coil spring 35 within the housing 34. The inner end of the plunger is slidably disposed within a pulsing or volumetric chamber 36 having an output port or spigot 37 formed in the outer side in the side wall adjacent to the outer end of the chamber. The outermost end of the chamber 36 is closed by a diaphragm 38 secured to the outer end of the housing by a suitable cap 39. A pneumatic or fluid supply port 40 is provided centrally of the cap 39. With the diaphragm 38 in the normal space position, the air flows through the chamber 40a between the cap 39 and the diaphram 38 to an output or exhaust spigot or port 41. The inner surface of the diaphragm 38 includes an enlargement 42 aligned with the plunger 33. Thus the initial inward movement of the plunger-diaphragm assembly forces fluid outwardly through the port 37. The plunger then engages the diaphragm 38, forcing it downwardly into sealing engagement over the supply port 40 and terminating the flow from the port 40. This generates a back pressure within the input supply line which corresponds to line 18 of FIG. 2.

Referring particularly to FIG. 3, a trace 43 illustrates the movement of the pushbutton 6 and the attached plunger 33 between the normal extended position and a depressed or inward position with time. With the transfer portion 44 of trace 43 illustrated as a curved portion indicating the time required to depress the button. The output at the port 37 is an alternating or AC type fluid pulse 45 having an initial relatively large output pressure signal portion 46 followed by a very slight negative portion 47 indicating slight rebound of the diaphragm 6a and plunger 33 assembly, as it engages the resilient diaphragm 38. A trace 48 of the signal at the supply port 40 is also illustrated and changes rapidly from a zero pressure to a relatively high pressure in response to the final movement of the plunger 33 into the closing engagement of the port 40. The logic signal at the common line 19 rises rapidly as at 48 during the final movement of the two pushbuttons when both ports 40, connected in parallel, are closed. The sensor 8 may be of any suitable construction, such as a well-known leak-port type wherein the punch 4 or some interrelated moving port selectively covers an output port or nozzle 49, with the back pressure directly controlled by the flow from nozzle 49.

The several signals 46 and 48 are combined with the sensor signal which is an on-off type binary signal to provide the desired anti-repeat control of the machine apparatus.

A preferred construction of the processing circuitry 9 is more fully shown in FIG. 4 wherein the logic unit 15 and the flip-flop unit 21 are shown including diagrammatically illustrated fluidic gates and related elements.

The main supply valve 13 is shown in a conventional symbol as a three-way pneumatically controlled manually reset valve normally connecting system supply to a logic supply regulator 50, which is used to establish a predetermined logic supply pressure at a logic supply line 51. The connection of line 51 to the several schematically illustrated elements is indicated by providing a common number 51 to the input side of such elements. The output of the valve 13 also provides a direct full pressure supply at the power system line 52 which is connected to supply the extend and retract controls 10 and 11. Each of the controls 10 and 11 is also a pneumatically actuated spring return, three-way valve and is illustrated generally similar to the valve 13.

The retract control 10 is described for purposes of clearly describing the present invention with the corresponding elements of control 11 identified by corresponding primed numbers. The three-way valve 10 normally connects the line 30 to an exhaust and maintains line 52 closed. The retract control valve 10 includes a pneumatic input unit 54 which selectively repositions the valve 10 to connect retract signal line 30 with the power system line 52 to close the exhaust line, as shown in the section 55 of the symbol representing the valve 10 in FIG. 4.

The control valve 11 has its input unit 54 connected to reposition the valve such as to couple supply line 52 to the extend line 29 as shown in the section 55' of its symbol in FIG. 4.

The controls 10 and 11 are coupled to the "not" output 25 of the triggered switch 21 as previously described and in the preferred illustrated embodiment of the invention a diaphragm fluidic repeater or amplifier 57 is inserted in line 25 such that the output line is at the same level as the input and is identified by the same number 25. The illustrated diaphragm repeater may be as illustrated in U.S. Pat. No. 3,734,117 and generally includes a transfer output chamber having a supply port 58 connected to the logic supply line 51 and turns an orifice 59' to a bleed orifice or port 59 and to the pneumatic input unit 54 of control 10 and through the logic inverter 28 to the pneumatic input 54' of the extend control 11. The orifice or port 59 projects into the housing in alignment with a diaphragm 60 defining an input chamber 61 to the opposite side thereof which is connected to the "not" output 25 of the triggered switch unit. A positive pressure or logic 1 signal from the bi-stable switch 21 forces the diaphragm 60 into overlying sealing relationship to the orifice 59 and prevents exhausting of the pressure to reference and thus provides a positive pressure to the inputs 54 and 54' of the pneumatic valve controls 10 and 11. In the absence of logic 1 signal, the repeater 57 exhausts the supply pressure to provide a corresponding logic 0 to the inputs 54 and 54'. The controls and 10 and 11, therefore, are in the normal non-actuated position with the retract control 10 in the open position and the extend control 11 in the closed position as a result of the logic inversion provided by the logic inverter unit 28.

The logic inverter 28 is diagrammatically illustrated and may be any fluidic device which reverses the input condition at the output and particularly may be an impact modulator such as shown in U.S. Pat. No. 3,272,215, with a single control input connected to the "not" output 25.

Conversely, when the output of the switch 21 is a logic 1 level, the diaphragm 61 is again set, and pressure is supplied via the amplifier 57 to positively actuate the retract control 10 and to remove the input signal from control 11 which causes retraction of the punch 4.

The appropriate signal is created at the output line 25 to operate the controls 10 and 11 in accordance with the condition and position of the pushbuttons 6 and 7 and sensor 8 as well as the proper sequence of the operation thereof, as follows.

Referring particularly to the logic unit 15 shown in FIG. 4, an inverter 62 has its input connected to the pulse line 17 of the pulse source means 16 of pushbutton 6. An orifice or restricter 63 also connects the common connection of input and pulseline to ground or reference to provide the pulse characteristic or trace 45 of FIG. 3 at the input of the logic inverter 62. The output of the logic inverter 62 is an inverted signal from that illustrated in FIG. 3 and thus provides a normal logic 1 output which is converted to a logic 0 output in response to depression of pushbutton 6.

The output of the pulse generator 16' of the pushbutton 7 is similarly connected to an inverter 62' of the logic unit 15 with the outputs of the inverters 62 and 62' connected to a common signal line 64. Each output connection includes a similar one-way or check valve 63a and 63a'. Both of the pushbuttons 6 and 7 must be simultaneously depressed in order to generate logic 0 signal at the common output line 64. This ensures that the system will not respond to actuation of a single pushbutton 6 or 7, or if one pushbutton is tied down.

This combined pulse signal is further combined with the output of the sensor 8 and the output of the triggered flip-flop unit 15 to require a predetermined relationship before the extend signal can be created.

The sensor 8 is illustrated including a venturi passageway 65 with the input connected to the logic supply line 51 to establish the output stream at nozzle 49. The signal line 20 is coupled to the throat sections 66 of the venturi passageway 65. With the free flow of the stream from nozzle 49, a relatively low pressure signal is generated at the throat section 66 and therefore at line 20. This corresponds to a logic 0. However, if the nozzle 49 is blocked, a back pressure is built up in the throat section 66, generating a relatively high pressure logic 1 signal therein and at line 20. A logic inverter 67 is connected between the output line 20 and one input of a two input Nor logic gate 68.

The Nor logic gate 68 may be of any suitable construction and preferably is constructed in accordance with the structure illustrated in U.S. Pat. No. 3,614,962, such that logic 1 at either one or both of the two inputs establishes a logic 0 output, and only when a logic 0 appears at both inputs is a logic 1 generated at the output of the gate 68.

The second input of the Nor gate 68 is connected to the extend feedback line 26 of the flip-flop unit 21. If the extend signal is not preset at line 29, the line 26 is also at a logic 0 which is fed back to gate 68 and the gate's output will assume a logic 1 and positively prevent the triggering of the trigger unit as a result of the operation of the pushbutton unit. In case the signal line 20 is at a logic level 1 and output of the inverter 67 at 0 due to a sensor's 8 failure (e.g. nozzle 49 plugged) or due to a tampering and pinching the line connecting sensor 8 to the venturi 65, the gate 68 positively prevents triggering. The Nor gate 68 thus selectively prevents actuating the trigger flip-flop 21 to cause the extend signal 29 to go "on" in case a sensor 8 signal (line 20) is at level 1 due to a failure, but doesn't prevent actuating it to cause the retract signal 30 to go "on" in case the sensor 8 is actuated by the punch 4 in extended position.

The output of the Nor gate 68 is connected by a check valve 69 to the common trigger signal line 22 with the pulse output signal line 64. In addition to a logic 0 from the pulsing network, the output of the Nor gate 68 must be maintained at logic 0 to generate a logic 0 at the line 22 and thus actuate the trigger flip-flop 21.

The system thus requires pulsing at a proper time with a proper signal from sensor 8 in order to cycle the machine.

In addition the fluidic system is constructed with a pushbutton position monitoring Nor gate 70 which requires continued holding of the pushbutton units 6 and 7 in the actuated position during the hazardous portion of the cycle. The Nor gate 70 may be similar to that previously described for the two input Nor gate 68 but employs a greater plurality of input signal nozzles. In the illustrated embodiment of the invention, the gate 70 is illustrated as a three input gate with any one input or any combination of the inputs holding the output at a logic 0, and providing a logic 1 only when all of the gate inputs are at logic 0. The first input of gate 70 is connected to a venturi 71 which continuously monitors the position of the pushbuttons 6 and 7. The gate input is connected to the throat section port 72 of the sensor venturi 71. The venturi 71 has its input connected to the logic supply line 51 and the output connected to line 19 and thus to the supply ports 40 and 40' of the means 16 and 16'. With the pushbuttons 6 and 7 actuated, a logic 0 signal is generated at the venturi throat section. When and only when both of the pushbuttons 6 and 7 are held depressed to block the flow through the chamber 40a, the flow through the venturi 71 is significantly blocked and the output pressure at the throat section 72 rises relative to a logic 1 level thereby indicating the simultaneous actuated position of the buttons 6 and 7.

If either or both buttons is released during a hazardous portion of the cycle, the gate 70 generates a logic 1 at the output on reset line 23 and the system will automatically reset and retract the punch 4. During the non-hazardous portion an interlocking signal of the sensor 8 and the feedback signal 27 permit latching of the system to complete the extend cycle.

The second input of the Nor gate 70 is connected to the output signal line 20 of the sensor 8 and thus to the throat section 66 of the sensor venturi 65 and responds to the punch position logic output accordingly. The sensor 8 produces a logic 0 output during the hazardous portion of the positioning of punch 4 and a logic 1 at the end of such movement. The third input to the feedback Nor gate 70 is connected to the retract feedback signal line 27 which is at a logic 0 during the extend or hazardous portion of the cycle and a logic 1 during the retract or non-hazardous portion.

Only with the three inputs to the gate 70 indicating a both hands button depressing position, a safe position of the punch 4 and the safe portion of the cycle indicated by the proper retract signal can the flip-flop unit 21 latch to permit release of the buttons 6 and 7. If the sensor 8 indicates a hazardous portion, its output is a logic 0. Similarly, during the hazardous portion, the retract signal will be a logic 0. If both hands are not coupled to the buttons 6 and 7, the output of the venturi button sensor 72 will also be a logic 0. Under these conditions the output of the Nor gate 70 is a logic 1, which signal is transmitted via the reset line 23 to the trigger flip-flop unit 15 to reset the trigger switch or flip-flop unit 15 thereby changing the output at the "Not" signal line 25 to a logic 0 and establishing a retract signal to activate the unit 10 with the output pressure at line 30. The triggered bi-stable switch unit 21 is illustrated as a multiple Nor gate circuit with a main flip-flop 74 including a three input Nor gate 75 and a two input Nor gate 76. The output of the three input Nor gate 75 generates the extend related output signal which is a logic 1 at terminal 24 when an extend punch condition is produced and a logic 0 when the punch retract condition is set. The two input Nor gate 76 generates the control signals at the "Not" output 25 which is of an opposite logic signal level from that of the extend output 24. The Nor gates 75 and 76 have their ouputs interconnected to one input of the opposite Nor gate to provide the flip-flop latching circuitry in accordance with conventional connections. The three input Nor gate 75 further has a second input connected to the reset signal line 23 from the logic gate 70 of the unit 15 and its third input is interconnected to the trigger line 22 of the logic unit 15 via an interlock signal coupling gate circuit 77. The two input Nor gate 76 which generates the "Not" output has one input connected to the output of three input Nor gate 75 and its second input connected by an interlocked line to the coupling circuit 77.

The coupling circuit is shown as a multiple Nor gate stage including a pair of three input Nor gates 78 and 79 with their outputs connected as an input to the opposite gate and as an input to the gates 75 and 76. Each of the gates 78 and 79 has a second input connected in common to each other and to the trigger output line 22 of the logic unit 15 for simultaneous and corresponding signaling. The third input of the gate 78 is connected to an extend feedback Nor gate 80 and the third input of gate 79 is connected to a retract feedback gate 81. The gates 80 and 81 each have an input connected to the output of the gates 78 and 79, respectively. The second input of the Nor gate 80 is connected to the extend signal line 24. The second input of the gate 81 is connected to the retract signal line 25.

As previously described, the trigger signal is created at line 22 when both of the pushbuttons 6 and 7 are activated to generate the pulse signals which are inverted to provide a logic 0 inputs to the gates 78 and 79. The retract line 27 is at a logic 1 such that the second input of the feedback Nor gate 81 is at a logic 1. Conversely, the main output Nor gate 75 is at a logic 0 which provides a logic 0 to the second input of the two input Nor gate 80.

Thus, prior to generation of logic 0 trigger signal at line 22, both of the coupling Nor gates 78 and 79 are held with a logic 1 input such that the outputs are at a logic 0 providing the corresponding logic 0 at the corresponding inputs of the main flip-flop gates 75 and 76. The retract signal is at a logic 1 such that the unit 10 is activated. This logic 1 requires that the second input of gate 76 also be at logic 0 which is held by the feed back to the coupling Nor gate 75 of the logic 1. The extend signal output 24 of the unit 75 is at a logic 0 which is fed back to the feedback gate 80, the second input of which is also at a logic 0 as a result of the logic 1 on the input of gate 78. This produces a latching logic 1 to the third input of gate 78. conversely, feedback gate 81 has a logic 0 input from gate 79 and a logic 1 from gate 76. This establishes the retract or safe cycle condition.

When the pushbuttons 6 and 7 are properly actuated to generate a logic 0, the corresponding inputs of coupling gates 78 and 79 go to logic 0 and trigger and the gate 79 to a logic 1 which triggers the output flip-flop 74 to the alternate condition. The gate 79 has all logic 0 inputs while the gate 78 has the one input connected to gate 80 held at logic 1. Therefore, the output of gate 78 remains at logic 0 while the output of gate 79 changes to a logic 1 which is applied to gate 76. The output of gate 76, therefore, changes to a logic 0, with corresponding reset of the fluidic repeater 57. The logic 0 output of the repeater 57 resets the control unit 10 and through the inverter 28 sets the control unit 11 to extend the punch. Simultaneously, altering of the main flip-flop generates a logic 0 to the interlock input of gate 75, which has the first input at logic 0 from the gate 78. The third input is connected by reset line 23 to the output of the monitoring gate 70 of the signal processing unit 15. The output of the interlocked three input Nor gate 70 must be at logic 0 as long as the dangerous portion of the cycle exists in order to hold gate 75 with a logic 1 output which is fed back to gate 76 to hold the logic 0 output necessary to the extend cycle portion. Thus, when the pushbutton pulse signals 46 and 46' terminate, the trigger signal line 22 again is at a logic 1 level and both gates 78 and 79 have logic 0 outputs. The input to gate 76 from gate 79 has, therefore, changes to logic 0 and the second input of gate 76 must be held at a logic 1 from gate 75. The interlock signals on lines 24 and 25 are also fed back to gates 80 and 81. Gate 80 remains with a logic 0 output in the continued presence of the logic 1 of the gate 75, and holds the corresponding gate input of gate 78 at logic 0.

Gate 81 has its first input held at the logic 0. The second input, connected to the output of gate 79, changed to log 0 as the result of the logic 1 from line 22 on gate 79. Gate 81 now produces a logic 1 to gate 79.

Thus, in the proper extend position, gates 78 and 79 have logic 1 inputs from the line 22 to force a logic 0 outputs. These are also compared with the retract-extend signal line levels by gates 80 and 81 and hold the third input of gate 78 at logic 0 and the third input of gate 79 at logic 1. If the pushbuttons 6 and 7 are actuated again to generate logic 0 inputs, gate 78 is set to logic 1 while gate 79 holds at a logic 0. This is the opposite of the condition created to produce the extend signal and when applied to gates 75 and 76 causes them to reset and establish the retract signal.

Gate 76 would have the same logic 0 output as previously set by the extend cycle. Gate 75 would however now have a logic 1 input from gate 78. The output of gate 75 would change to a logic 0, and gate 76 would now have both inputs at logic 0 and generate a logic 1 output which, as previously described, would activate unit 10 and deactivate unit 11. The several logic gates, particularly gates 80 and 81, have the logic signals sequenced and interlocked to establish the retract position.

Thus, the operator must simultaneously depress the pushbuttons 6 and 7 to establish the extend cycle and must release and again depress the pushbuttons to establish the retract cycle.

During the dangerous portion of the extend cycle, the system continuously monitors the position of the punch 4 and the pushbuttons 6 and 7 to insure the safe operational procedures are followed by the press operator. If the hands are removed during such dangerous portion, the output of the three input Nor gate 70 changes to a logic 1 and positively drives the output of the three input Nor gate 75 of the output flip-flop unit to a logic 0 which, as just described, reverses the condition of the flip-flop gates 75 and 76 to the alternate condition to again activate the retract unit 10 and deactivate the extend unit 11.

Thus, during the hazardous portion of the cycle, the sensor 8 produces a logic 0 signal to gate 70. The output of the signal line 25 is at a logic 0 which is fed back via line 27 to the second input of gate 70. The third input of gate 70 which monitors the pushbuttons must, therefore, be held at a logic 1 to hold the Nor gate 70 at a logic 0. Release of either one or both of the pushbuttons 6 and 7 provides a free path for the venturi 71 via lines 19 and 18 with a resulting logic 0 at the signal line to gate 70.

Once the hazardous portion has terminated, the output of the punch position sensor 8 generates a logic 1 to gate 70 to hold the output at a logic 0 and the operator, may therefore, remove his hands from the pushbuttons 6 and 7 during the final cycle of the machine.

Further, the logic 1 output of the sensor 8 is coupled through the inverter 67 as a logic 0 to the gate 68.

Further, if an any time during the operation of the machine, the extend signal at line 29 is generated prior to depressing of the pushbuttons 6 and 7, the fuse 14 is activated by a signal transmitted to the input side of the fuse 14 to cut off the main supply valve 13.

More particularly, the illustrated fuse 14 of FIG. 4 includes a diaphragm comparator 84 such as shown in U.S. Pat. No. 3,662,779. Generally, the comparator 84 includes a centrally located diaphragm 85 defining an input chamber 86 connected through a suitable fluid diode or check valve 87 and line 31 to the signal line 29 and separately by a diode 88 to line 32 which senses the state of the line 19. Signal line 32 is shown connected to venturi 71 to transmit directly to the chamber 86 the pressure related to that at line 19. The extend signal line 29 is connected to a pair of pressure dividing restrictors 89 and 90 to reference with the junction of the restrictors connected to chamber 86. Thus if the pushbuttons 6 and 7 are depressed, the output signal at the common sensing line 19 and the venturi 71 rises to transmit a corresponding logic signal to chamber 86 to reposition the diaphragm 85 with respect to an orifice 91 in a controlled chamber 92 to the opposite side of the diaphragm. This orifice 91 is connected in series with a restrictor 93 to the extend signal line 29. With the diaphragm 85 in the normal standby position, a control port 94 in chamber 92 is connected to ground or reference by a restrictor 95 and also directly to the operator or input 96 of the supply control valve 13. If an erroneous extend signal is created at line 29 prior to the simultaneous depression of the buttons 6 and 7, the extend signal is transmitted via the coupling restrictor 93 to the orifice 91, and therethrough to the input 96 of control valve 13. The initial pressure on the upper side of the diaphragm 85 will be essentially at reference pressure as the result of the opening of one or both of the source means 16 or 16' with pushbuttons 6 and 7 in the non-actuated position and finally will increase to a level of the extend signal 29 reduced by means of the restrictors 89 and 90. The pressure chamber therefore in the upper chamber 86 is less than that in the lower chamber 92 and both pressure in the upper and lower chamber is acting against the same diaphragm area. Therefore, the diaphragm 85 stays in its upper position, opening the port 91 and the extend signal pressure will activate the valve 13 to turn off the main air supply to the system.

If, however, the buttons 6 and 7 are properly depressed prior to the establishment of pressure at the extend signal line 29 a positive signal is transmitted via the coupling line 32 to the input chamber 86 of the fuse 14. The positive signal pressure from the pushbutton venturi 71 holds the diaphragm 85 against the orifice or port 91 and thereby positively prevents transmission of a signal from the extend line 29 through the comparator 84 to the system valve 13. The signal in the line 29 is generated with a very slight time delay after the signal to the input chamber 86 has been applied. This time delay is inherent in the circuits 15 and 21 and the valve 11. When the signal 29 is generated, the diaphragm 85 has already closed the port 91 and therefore the pressure of the signal 29 acts against the diaphragm only on a very small area of port 91 and cannot overcome the force applied to the upper side of it. As a result the system and logic pressure is maintained. After latching of the system into operation for completion of a cycle, the pushbuttons 6 and 7 can be released. Even though the venturi pressure now drops, the extend signal pressure at the junction of the restrictors will be sufficiently great to maintain the comparator 84 in the closed position and to thereby prevent turn off of the main valve 13. During the retract portion of the cycle, the fuse 14 resets.

During the next cycle, the pushbuttons 6 and 7 must again be activated before the extend signal 29 is created in order to maintain the system supply.

In the event the pushbuttons are tied down to maintain the positive latch to the comparator 84 the system cannot cycle as a result of the previous anti-tiedown feature provided by the pulse signal source means of the buttons 6 and 7 and the logic circuit processing thereof. Once the system turns off, the proper sequence of actuating the pushbuttons 6 and 7 prior to actuation of the extend output must occur to recycle and thus provides a protection against circuit failure.

The illustrated system embodiment of the novel fluidic control system continuously monitors the position of the system to distinguish between hazardous and safe operating periods and permits the release of the manually operable fluid signal source means during the safe portion of the cycle such that the operator can attend to other necessary matters. The system continuously monitors the inputs of the several manual controls and the sensor to terminate operation if any are disconnected, or for some reason or other in a wrong state. The continuous monitoring of the output state further guards against a wrong state in relationship to the manual controls and the machine. The fluidic system can be readily applied to punch press type machines and other cyclically operating machines and is particularly adapted to present day manufacturing facilities which generally have the necessary air supply system or which can be conveniently and economically provided.

Various modes of carrying out the invention are contemplated as being within the scope of the following claims, particularly pointing out and distinctly claiming the subject matter which is regarded as the invention.

We claim:

1. A fluid machine control apparatus for a movable working element of a machine comprising a plurality of manually operable fluid signal source means having a first position and operable to a second position, each of said source means generating a plurality of unique fluid signals in response to the movement from the first to the second position to monitor the actuation thereof and the setting of said source means to said second position, sensor means for monitoring the position of the working element and producing a machine position related fluid output signal, a fluid signal logic processing means including fluid signal comparator means including first monitor means monitoring the operation of the source means and the sensor and responsive to simultaneous generation of signals of the source means and the output of the sensor to produce a control output to selectively enable the operation of the machine and second monitoring means monitoring the setting of the source means to the second position and the sensor means to selectively disable the machine in response to movement from said second position.

2. The fluid machine control apparatus of claim 1 wherein said logic processing means includes a logic unit operable to generate a start trigger signal and a reset signal and a bi-stable switch means is connected to said logic unit to establish a machine operate signal and alternately a machine terminate signal.

3. The fluid machine control apparatus of claim 1 including a sequence monitor means having a first input means connected to respond to said fluid signal source means and second input means connected to respond to the signal logic processing means to disable the machine in response to producing of the control output prior to a selected fluid signal of the source means.

4. The fluid machine control apparatus of claim 1 wherein the logic processing means includes feedback means to compare the status of the monitor means and the fluid signals of the source means and the sensor to prevent locking of the source means to the second position and the automatic recycling of the machine.

5. The machine control apparatus of claim 1 wherein each of said source means generates a first fluid pulse signal in response to the movement from the first to the second position and a second fluid binary signal in response to setting of said second position, said sensor means produces a binary signal as said machine position related fluid output signal, said sequence monitor means includes a diaphragm operator having an input chamber connected to said first and second input means and a transfer chamber connected to the second input means, a signal delay means connected to the second input means to delay transfer of the signal to the input chamber, said transfer chamber having an output operable to disable the source means in response to the control output prior to the binary signal.

6. The fluid machine control apparatus of claim 5 wherein each of said signal source means includes a manual operator, a pump means operable to generate said first pulse signal and a fluid control valve means to generate said second fluid binary signal.

7. A fluid machine control apparatus for controlling the cyclical operation of a moving element of a machine comprising a pair of manually operable fluid signal source means having a first position and operable to a second position, each of said source means generating a first pulse signal in response to the movement from the first to the second position and a second binary signal in response to setting of said second position, a sensor means for monitoring the position of a moving element of the machine and producing a machine position fluid output signal, a bi-stable switch means connected to control operation of the machine, a signal logic processing means including first and second comparator means monitoring the operation of the source means and the sensor, said first comparator means being responsive only to simultaneous generation of the first pulse signals and the output of the sensor to produce an enable set signal to the bi-stable switch means, and said second comparator means being responsive to the second binary signals and the output of the sensor and the bi-stable switch means to reset the switch means if the secondary binary signal is removed during a selected portion of the machine cycle.

8. The fluid machine control apparatus of claim 7 wherein each of said signal source means includes a manual operator coupled to a pump means operable to generate said first pulse signal and a fluid control valve means to operably open and close a signal line to generate said second binary signal.

9. The fluid machine control apparatus of claim 8 including a sequence monitor means having a first input means connected to respond the enable set signal processing means to disable the machine in response to producing of the control output prior to the first fluid signals.

10. The control apparatus of claim 9 having a supply valve means to supply fluid to the control, wherein said sequence monitor means includes a diaphragm comparator having a dead-ended input chamber and a transfer chamber with a common diaphragm wall therebetween, first means connecting the input chamber to the binary signal means, a pressure dividing means connecting the input chamber to control output, a supply means terminating in the transfer chamber and connected to the control output, an output means terminating in the transfer chamber and connected to actuate the supply valve means.

11. The fluid machine control apparatus of claim 7 wherein a venturi sensing element is connected in series with the supply ports to the control valve means of each of the binary signal means and having an output means establishing an Anded output connected to the second comparator means.

12. The fluid machine control apparatus of claim 11 having a sequence monitor means having a first input means connected to the output means of the venturi sensing element and second input means connected to respond the enable set signal processing means to disable the machine in response to producing of the control output prior to the first fluid signals.

13. The fluidic machine control apparatus of claim 7 wherein said sensor includes a back-pressure machine sensor having a nozzle position to establish a signal stream selectively interrupted by said machine to produce a binary pressure logic signal, and said source means includes a pair of manually operable pushbuttons, a pair of signal generators connected one each to each of the pushbuttons, each of said signal generators including a pulse means having a plunger means mounted within a pulse chamber and a binary signal means having a control chamber with a common diaphragm wall with said pulse chamber, said diaphragm wall being in opposed relation to the plunger and engaged by said plunger in response to depression of the corresponding pushbutton, said chamber having an output port with the movement of the plunger generating a pulse signal, a supply port and exhaust port terminating in said control chamber, said supply port being located in opposed relation to the diaphragm and sealed with the plunger depressed.

14. The control apparatus of claim 7 wherein said logic processing means includes a triggered flip-flop unit as said bi-stable switch means establishing a second stop signal output, said drive and stop outputs being opposite binary signals, said flip-flop means having interconnected trigger inputs connected to said first comparator means and to the enable signal and having feedback means to selectively latch the flip-flop means in a set and reset state, said flip-flop means having a reset input connected to said second comparator means.

15. The machine control apparatus of claim 14 wherein said flip-flop means includes a triggered flip-flop stage including first and second multiple input Nor gates having said first drive signal output and said second stop signal output, a pair of coupling Nor gates having interconnected trigger inputs and each having an interlocking input connected to the output of the opposite coupling Nor gate, the outputs of the coupling Nor gates being connected to inputs of the output Nor gates, a feedback Nor gate having an input and an output connected to the output and input of the first coupling Nor gate, a second feedback Nor gate having an input and an output connected to the output and input of second coupling Nor gate, said first comparator means having an output connected to the trigger inputs of said coupling Nor gates, said second comparator means connected to the flip-flop stage to reset the flip-flop stage.

16. The machine control apparatus of claim 15 wherein said first comparator means includes logic signal combining means connected to AND the pulse signals and either the drive signal or the absence of the sensor signal.

17. The machine control apparatus of claim 15 wherein said second comparator means includes a logic signal combining means connected to produce a reset signal in response to a corresponding logic signal from the sensor and the source means and the flip-flop unit.

18. The control apparatus of claim 7 wherein said first comparator means is a logic gate means having inputs connected to the pulse means of said generators and to the position sensor and to the drive signal output, and having an output connected to the trigger inputs of said flip-flop units, said second comparator means is a logic gate means having a plurality of inputs connected to the position sensor and to the binary signal means of said signal generators and to said stop signal output.

19. The control apparatus of claim 7 having a fluid interface means including fluid activated valve means connected to the enable signal output and oppositely responsive thereto to alternately establish a stop output and a drive output, a fluid supply valve means for supplying fluid to the apparatus, and a fuse means connected to control said supply valve means.

20. The control apparatus of claim 19 wherein said fuse means includes a diaphragm comparator having a dead-ended input chamber and a transfer chamber with a common diaphragm wall therebetween, first means connecting the input chamber to the binary signal means, a pressure dividing means connecting the input chamber to the drive output, a supply nozzle terminating in the transfer chamber and connected to the drive output, and an output nozzle terminating in the transfer chamber and connected to actuate the supply valve means.

21. A fluid machine control apparatus for a machine having a cyclically moving work element moving through a hazardous portion and a non-hazardous portion in each cycle, comprising a fluid sensor establishing a signal stream selectively interrupted by said machine to produce a binary logic signal, a pair of signal generators each having a manually operable control element, each of said signal generators including a pulse forming means and a binary signal forming means, a bi-stable fluid switch means establishing a first extend signal output and a second retract signal output, said extend and retract outputs being opposite binary signals, first and second logic coupling means having interconnected inputs and connected to provide binary output signals, the outputs of the coupling means being connected to inputs of the bi-stable fluid switch means, feedback means connected between the outputs of the bi-stable switch means and the inputs of the coupling means, a first signal combining logic means having a plurality of inputs connected to the pulse means of said generators and to the position sensor and to the extend signal output and having an output connected to the interconnected inputs of said coupling means to set the bi-stable switch means, a second signal combining logic means having a plurality of inputs connected to the position sensor and to the binary signal forming means of said signal generators and to said retract signal output, and said second combining logic means being connected to reset said bi-stable switch means in response to preselected release of said manually operable control elements.

22. The fluid control apparatus of claim 21 wherein a fluid supply valve means is provided for supplying fluid to the apparatus, a fuse means is connected to control said supply valve means to terminate the supply if the extend signal is generated prior to the pulse signals of the pulse forming means.

23. The control apparatus of claim 22 wherein said fuse means includes a diaphragm comparator having a dead-ended input chamber and a transfer chamber with a common diaphragm wall therebetween, first means connecting the input chamber to the binary signal means, a pressure dividing means connecting the input chamber to extend drive signal, a supply means terminating in the transfer chamber and connected to the extend drive output, an output means terminating in the transfer chamber and connected to actuate the supply valve means.

24. The machine control apparatus of claim 21 wherein said signal generator control elements are pushbuttons, each of said signal generators including a plunger-diaphragm means, said diaphragm-plunger means having a plunger engaging the common diaphragm in response to depression of the corresponding pushbutton, said pulse chamber having a pulse port adjacent the common diaphragm with the movement of the plunger-diaphragm means generating a pulse signal, a control chamber mounted to the pulse chamber overlying said common diaphragm, a supply port and exhaust port terminating in said control chamber, said supply port being located in opposed relation to the common diaphragm and sealed with the plunger depressed, said binary signal forming means being connected to said supply port.

25. The control apparatus of claim 24 wherein said bi-stable fluid switch means is a triggered flip-flop means including first and second Nor gates output establishing a main flip-flop unit having a first extend signal output and a second retract signal output, said extend and retract signals being opposite binary signals first and second coupling Nor gates having interconnected trigger inputs and each having an interlocking input connected to the output of the opposite coupling Nor gate, the outputs of the coupling Nor gates being connected to inputs of the output Nor gates, a feedback Nor gate having an input and an output connected to the output and input of the first coupling Nor gate, a second feedback Nor gate having an input and an output connected to the output and input of second coupling Nor gate, a first signal combining means having inputs connected to the pulse ports of said generators and to the position sensor and to the extend signal otuput and having an output connected to the trigger inputs of said coupling Nor gates to produce a start signal in response to simultaneous formation of said pulse signals in the presence of the extend signal or a safe position signal of the sensor, an anti-tiedown Nor gate having a plurality of inputs connected to the position sensor and to the binary signal means and to said retract signal output, fluid interface means including fluid activated valve means connected to the retract signal output and oppositely responsive thereto to alternately establish a retract drive output and an extend drive output, a fluid supply valve means for supplying fluid to the apparatus, a fuse means connected to control said supply valve means, said fuse means being a diaphragm comparator having a dead-ended input chamber and a transfer chamber with a common diaphragm wall therebetween, first means connecting the input chamber to the binary signal means, a pressure dividing means connecting the input chamber to extend drive output, a supply nozzle terminating in the transfer chamber connected to the extend drive output, an output nozzles terminating in the transfer chamber and connected to actuate the supply valve means.

26. The machine control apparatus of claim 25 wherein said sensor is a back-pressure machine sensor having a nozzle, a venturi means connected to said nozzle to establish a signal stream, a machine element movable to interrupt the stream and produce said binary position logic signal related to hazardous and non-hazardous portion of the cycle.

27. The fluid machine control apparatus of claim 25 wherein binary signal forming means includes a venturi element connected in series with the supply ports of each of the control chambers and establishing an Anded output connected to the anti-tiedown Nor gate and to the input chamber of said fuse means.

28. A fluid control apparatus for controlling a machine having a cyclically moving tool element comprising a fluidic responsive machine control input means to selectively operate the machine to move said tool element, a plurality of manually operable fluid signal source means having a first position and operable to a second position and generating a plurality of unique fluid signals in response to movement between said first and second positions, a fluid signal logic processing means monitoring the operation of the source means and responsive only to simultaneous operation of said plurality of source means to produce a control output to said machine control input means and enabling the operation of the machine, and a sequence monitor means having a first input means connected to respond to operation of both said fluid signal source means to operatively disable the sequence monitor means and second input means connected to respond to the output of the signal logic processing means to actuate the input means and disable the machine, said monitor means responding in accordance with the first signal applied at the first and second input means and continuously monitoring the sequence of the operation of the source means and the presence of the control output and permitting operation only in response to a proper sequence including simultaneous operation of the source means prior in the absence of said control output and disabling of the machine only in response to producing of the control output at said second input means, prior to operation of the source means.

29. The machine control apparatus of claim 28 said sequence monitor means includes a diaphragm operator having an input chamber connected to said source means and said processing means and a transfer chamber having an output operable to disable the apparatus in response to establishing of the control output prior to the signal from the source means.

30. The fluid machine control apparatus of claim 29 having a signal reducer connected between the output of the processing means and the input means.

31. The fluid machine control apparatus of claim 29 wherein each of said source means includes a valve means, a venturi sensing element connected to the valve means and having an output connected to the input chamber to terminate the machine operation.

32. The control apparatus of claim 28 having a fluid interface means including fluid activated valve means connected to the signal output of the logic processing means and oppositely responsive thereto to alternately establish said control output as a stop output and a drive output, a fluid supply valve means for supplying fluid to the apparatus, said sequence monitoring means including a diaphragm comparator having a dead-ended input chamber and a transfer chamber with a common diaphragm wall therebetween, a supply nozzle terminating in the transfer chamber and connected to the drive output, an output nozzle terminating in the transfer chamber and connected to actuate the supply valve means, first logic means connecting the input chamber to the source means to respond to the simultaneous operation of the source means to position said diaphragm wall to engage and close one of said nozzles, and a pressure dividing means connecting the input chamber to the drive output of the logic processing means and operable to hold the diaphragm wall spaced from both said nozzles and thereby operatively disconnect the input chamber from said first logic means in response to producing the drive output prior to operation of the source means.

* * * * *